United States Patent
Savaresi et al.

(10) Patent No.: US 11,498,432 B2
(45) Date of Patent: Nov. 15, 2022

(54) HAND-PUSHED MOTORIZED MOVEMENT DEVICE

(71) Applicants: EFFORTLESS MOBILITY S.R.L., Altavilla Vicentina (IT); E-NOVIA S.P.A., Milan (IT)

(72) Inventors: Sergio Matteo Savaresi, Cremona (IT); Matteo Corno, Milan (IT); Luca Onesto, Momo (IT); Ivo Boniolo, Bovision Masciago (IT); Alberto L. Cologni, Osio Sopra (IT); Ivan Tomasi, Creazzo (IT)

(73) Assignees: EFFORTLESS MOBILITY S.R.L., Altavilla Vincentina (IT); E-NOVIA S.P.A., Milan (IT)

( * ) Notice: Subject to any disclaimer, the term of this patent is extended or adjusted under 35 U.S.C. 154(b) by 608 days.

(21) Appl. No.: 16/604,333

(22) PCT Filed: Apr. 3, 2018

(86) PCT No.: PCT/IB2018/052279
§ 371 (c)(1),
(2) Date: Oct. 10, 2019

(87) PCT Pub. No.: WO2018/189621
PCT Pub. Date: Oct. 18, 2018

(65) Prior Publication Data
US 2020/0156482 A1 May 21, 2020

(30) Foreign Application Priority Data
Apr. 13, 2017 (IT) .................. 102017000041556

(51) Int. Cl.
*B60L 15/20* (2006.01)
*B62B 5/00* (2006.01)
*B62B 5/06* (2006.01)

(52) U.S. Cl.
CPC ........ *B60L 15/2081* (2013.01); *B62B 5/0043* (2013.01); *B62B 5/0073* (2013.01);
(Continued)

(58) Field of Classification Search
CPC .. B60L 15/2081; B60L 15/20; B60L 15/2072; B60L 50/20; B60L 2200/20;
(Continued)

(56) References Cited

U.S. PATENT DOCUMENTS 5,540,296 A * 7/1996 Strothmann ........ B60L 15/2036
180/332
5,746,282 A 5/1998 Fujiwara et al.
(Continued)

FOREIGN PATENT DOCUMENTS

DE 19614411 A1 * 10/1996 ............. B60K 26/02
DE 19744083 A1 * 4/1999 ........... B60R 21/013
(Continued)

OTHER PUBLICATIONS

Matteo Corno et al., Road Slope Estimation in Bicycles without Torque Measurements, Aug. 2014, International Federation of Automatic Control, 6295-6300 (Year: 2014).*
(Continued)

*Primary Examiner* — Steve Clemmons
(74) *Attorney, Agent, or Firm* — Mark Malek; Widerman Malek, PL

(57) ABSTRACT

A motorized movement device includes a frame, first and second wheels connected to the frame, and first and second motors connected respectively to the first and second wheels that are commandable by respective command signals. The motorized device also includes an inertial measuring unit configured to detect the longitudinal acceleration, pitch angular speed, and yaw angular speed of the movement device and for providing signals representative of the same.
(Continued)

The motorized device also includes sensors for detecting speeds of the wheels and configured to provide signals representative thereof. The motorized device further includes a control unit comprising a module for estimating the slope, and longitudinal thrust exerted by a user to the device, yaw torque applied by the user. The control unit also includes a module for compensating the slope, a thrust amplifying module, a yaw torque amplifying module, and a torque allocating module.

13 Claims, 4 Drawing Sheets

(52) U.S. Cl.
CPC ............. *B62B 5/06* (2013.01); *B60L 2200/20* (2013.01); *B60L 2200/24* (2013.01); *B60L 2200/30* (2013.01); *B60L 2200/34* (2013.01); *B60L 2240/16* (2013.01); *B60L 2240/22* (2013.01); *B60L 2240/26* (2013.01); *B60L 2240/421* (2013.01)

(58) Field of Classification Search
CPC ............. B60L 2200/24; B60L 2200/30; B60L 2200/34; B60L 2240/16; B60L 2240/22; B60L 2240/26; B60L 2240/421; B60L 2240/18; B60L 2240/20; B60L 2240/24; B60L 2240/461; B60L 2240/642; B60L 2250/22; B62B 5/0043; B62B 5/0073; B62B 5/0026; B62B 5/0069; B62B 5/06; Y02T 10/64; Y02T 10/72; Y02T 90/16
See application file for complete search history.

(56) References Cited

U.S. PATENT DOCUMENTS

| | | | | |
|---|---|---|---|---|
| 6,003,627 | A * | 12/1999 | Ishida | A61G 5/048 180/65.8 |
| 6,459,962 | B2 * | 10/2002 | Ulrich | B62D 51/04 701/1 |
| 8,322,477 | B2 * | 12/2012 | Kamen | B62M 7/00 180/181 |
| 9,636,993 | B2 * | 5/2017 | Biderman | A63B 21/0058 |
| 9,714,046 | B2 * | 7/2017 | Strothmann | B60L 50/20 |
| 10,183,687 | B2 * | 1/2019 | Kubo | B62B 5/064 |
| 10,232,871 | B2 * | 3/2019 | Hane | B62B 3/00 |
| 10,246,099 | B2 * | 4/2019 | Savaresi | B60W 40/13 |
| 10,384,742 | B2 * | 8/2019 | Como | B62M 6/90 |
| 2002/0117341 | A1 * | 8/2002 | Lan | B62M 6/45 180/181 |
| 2007/0017727 | A1 * | 1/2007 | Messih | B60W 40/13 180/282 |
| 2007/0041817 | A1 * | 2/2007 | Kakinuma | B62B 5/02 414/490 |

FOREIGN PATENT DOCUMENTS

| | | | | |
|---|---|---|---|---|
| DE | 10053043 | A1 * | 9/2001 | ............. B62K 3/002 |
| DE | 102011114337 | A1 | 3/2013 | |
| EP | 2332806 | A2 * | 6/2011 | ........... B62B 5/0073 |
| EP | 2848239 | A1 | 3/2015 | |
| EP | 2997337 | B1 * | 9/2020 | ............. B60W 40/13 |
| GB | 2358716 | A * | 8/2001 | ............. B60L 15/20 |
| JP | H08282498 | A * | 10/1996 | ............... B62B 3/00 |
| WO | WO-2005094480 | A2 * | 10/2005 | ........... B62B 5/0026 |
| WO | WO-2012163789 | A1 * | 12/2012 | ............... B62H 5/00 |
| WO | WO-2013167600 | A2 * | 11/2013 | ............... A61G 7/08 |
| WO | WO-2014187864 | A1 * | 11/2014 | ............... A61G 7/08 |
| WO | 2015107713 | A1 | 7/2015 | |
| WO | WO-2015107713 | A1 * | 7/2015 | ............... B62B 9/00 |
| WO | WO-2015128239 | A1 * | 9/2015 | ............. B62K 3/002 |
| WO | 2016079614 | A1 | 5/2016 | |

OTHER PUBLICATIONS

International Search Report dated Aug. 31, 2018; 3 pages.

* cited by examiner

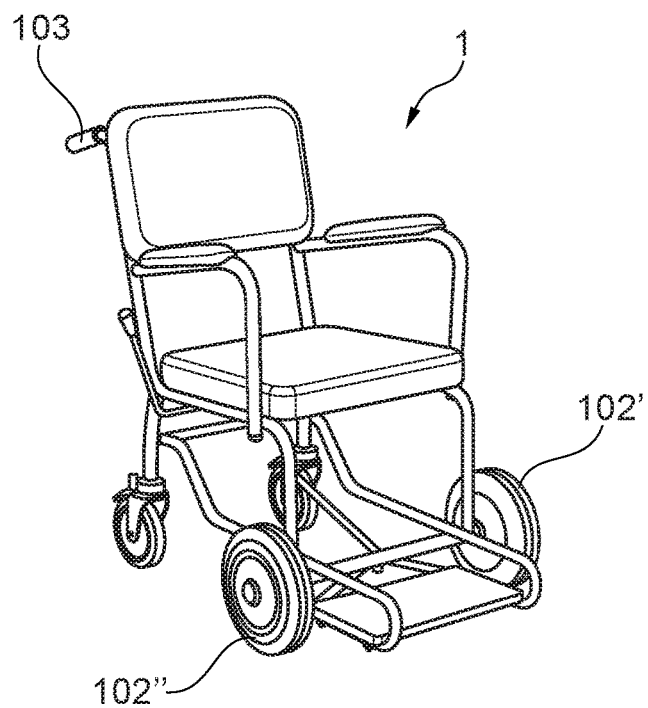
Fig. 1d Fig. 1e
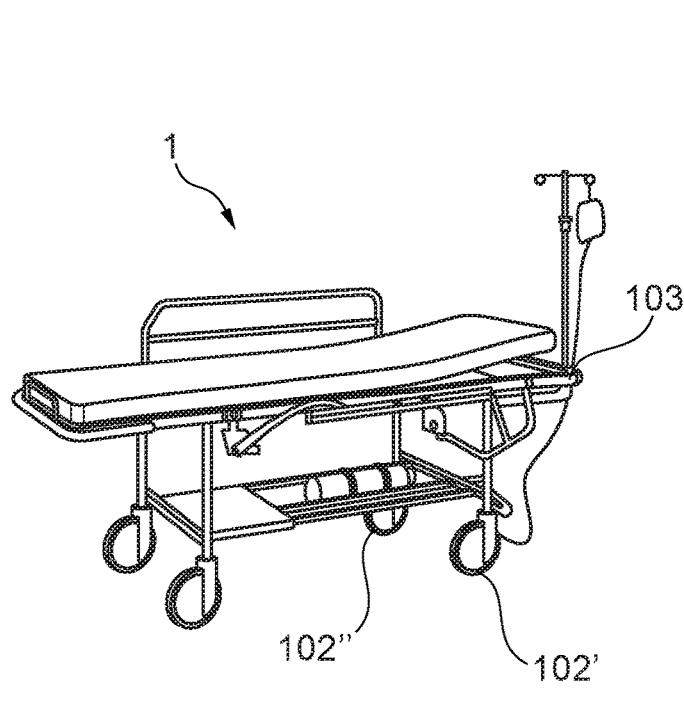
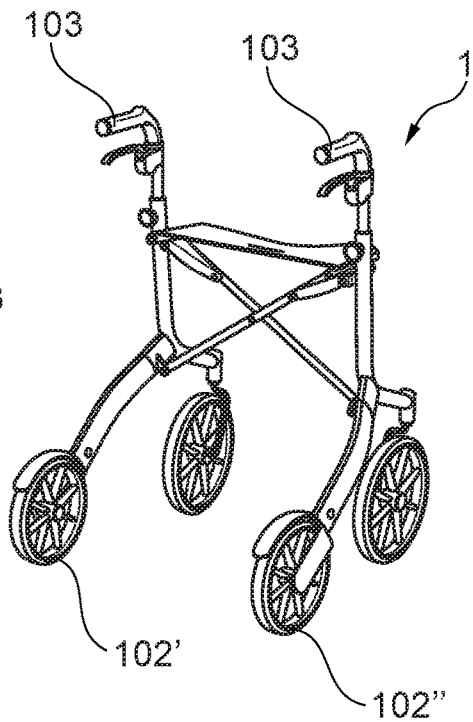
Fig. 1f Fig. 1g

HAND-PUSHED MOTORIZED MOVEMENT DEVICE

FIELD OF THE INVENTION

The present invention refers to a motorized movement device, particularly a hand-pushed device, such as for example a baby carriage or cart for transporting goods (e.g. a shopping cart, golf club trolley, airport trolley, suitcase, or similar), disabled person wheelchair, stretcher, walker, hospital bed, or similar.

PRIOR ART

Motorized movement devices wherein one or more motors drive wheels as an aid to an user, for example for transporting heavy loads for long distances or along sloped paths, are known in the art.

The known movement devices generally comprise a command for activating/deactivating the motor.

For example, some transporting carts in industrial fields are provided with a joy-stick for actuating the motors, which indicates the desired advancement direction. However, such devices are generally not very user-friendly, because require a specific action by the user on the joystick for actuating the motors.

In the baby carriages field, systems wherein a handle is actuated by the user and this, by suitable force or torque sensors, detects the exerted thrust which is used as an input parameter for determining how much the motors are enslaved, were proposed. However, the presence of force/torque sensors makes such devices expensive, unreliable, and complicated to calibrate, and in addition prone to measuring errors caused, for example, by objects hooked by the user to the handle itself.

Moreover, generally, in the known devices the action of the motors causes the behavior of the movement device to be substantially different from the behavior which the device would naturally have without the motors operation. This aspect is particularly critical in movement devices such as the baby carriages.

BRIEF SUMMARY OF THE INVENTION

Therefore, it is an object of the present invention to make available a motorized movement device configured so that the behavior thereof is as much as possible natural even though the motors are operating, in other words configured so that the user perceives the device as if the motors were deactivated, but with less effort exerted by the user.

This and other objects are met by a motorized movement device according to claim 1.

The dependent claims define possible advantageous embodiments of the invention.

BRIEF SUMMARY OF THE INVENTION

In order to gain a better comprehension of the invention and to appreciate the advantages, some exemplifying non-restrictive embodiments thereof will be described in the following with reference to the attached drawings, in which:

FIGS. 1a-1g show motorized movement devices according to possible embodiments of the invention;

Figure 3A:
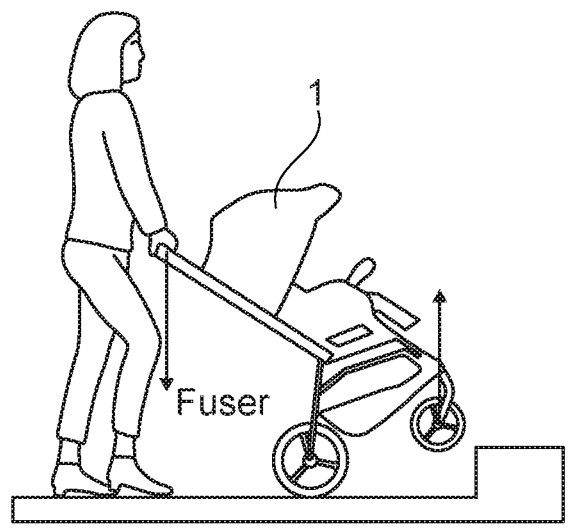
Figure 3B:
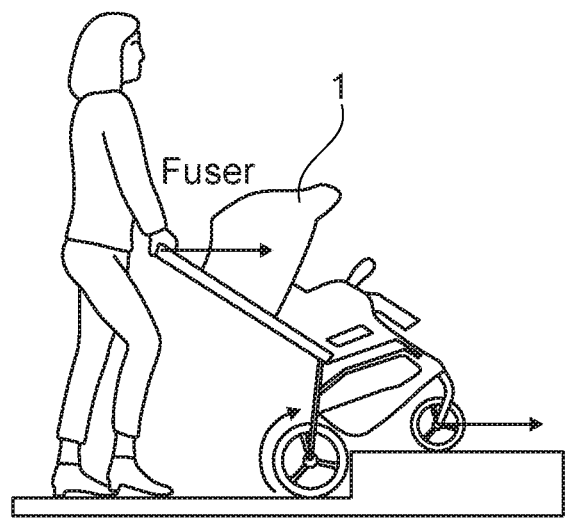

FIGS. 3a-3b schematically show a possible maneuver of an user for getting a motorized movement device past an obstacle. On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

DESCRIPTION OF EMBODIMENTS OF THE INVENTION

Figure 1A:
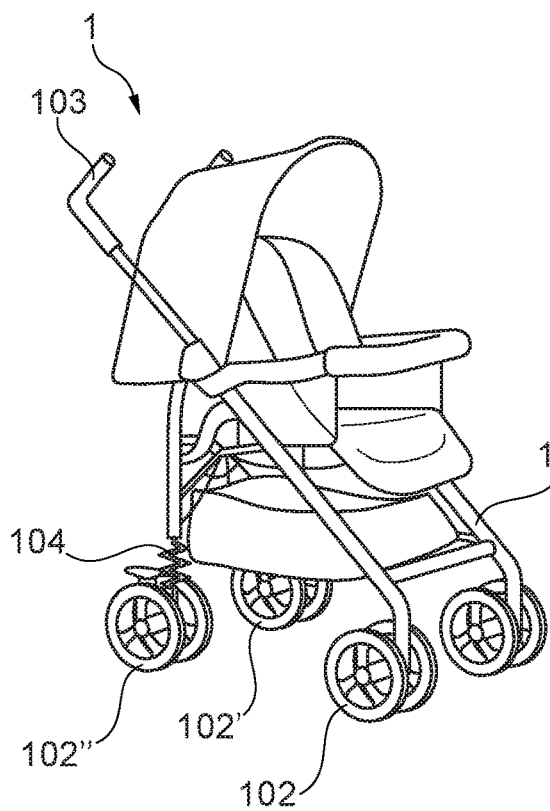
Figure 1B:
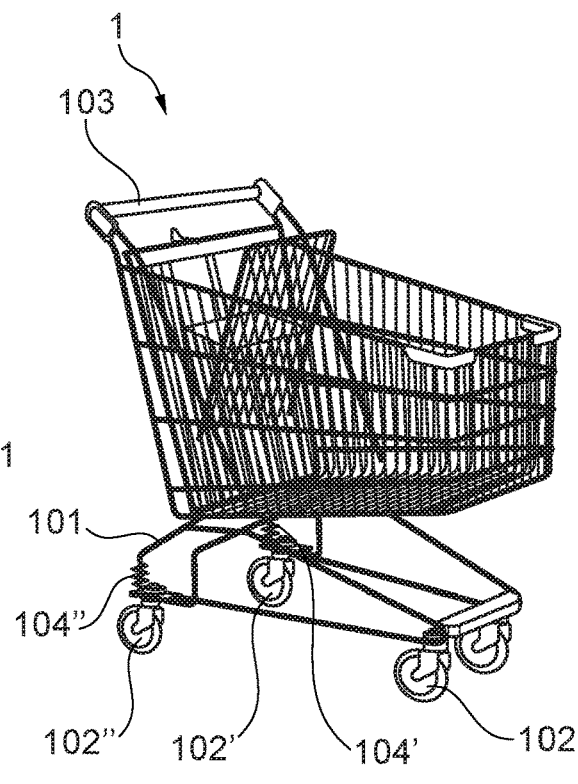
Figure 1C:
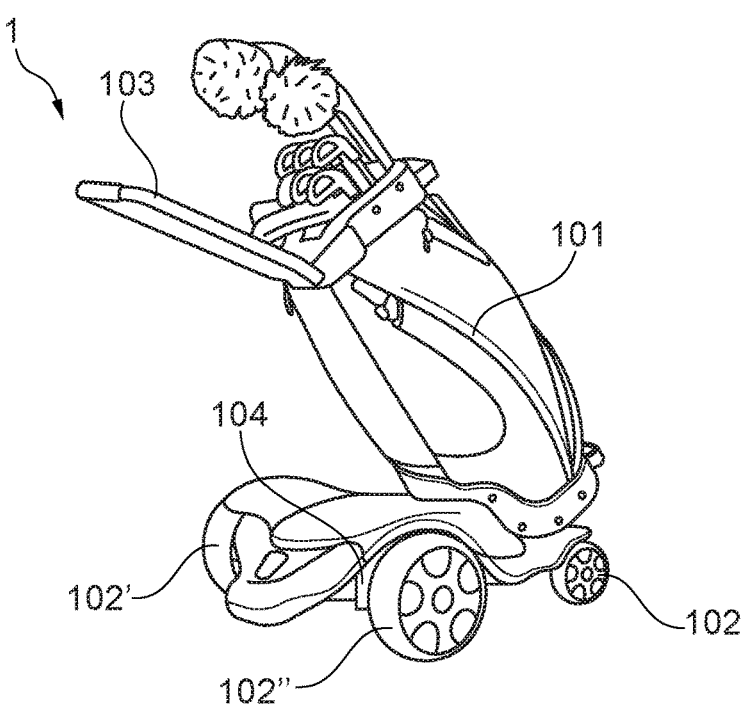

A motorized movement device according to the invention is shown in the attached figures by reference 1. The movement device 1 can be of a type discussed in the introductory part of the present description. For example, it can be implemented as a baby carriage (FIG. 1a), a shopping cart (FIG. 1b), golf club trolley (FIG. 1c), disabled person wheelchair (FIG. 1d), suitcase trolley (FIG. 1e), hospital bed/stretcher (FIG. 1f), walker (FIG. 1g), or similar.

Generally, the movement device 1 comprises a frame 101, wheels 102, and one or more handles 103 by means of which the user moves the device itself. According to a possible embodiment, the movement device 1 comprises suspensions 104 operatively interposed between the frame 101 and at least some of the wheels 102.

The movement device 1 comprises a first and a second motors (not shown in the figures), independent from each other, each connected to a respective wheel of the device itself. Specifically, the wheels to which the motors are coupled, are non-steering wheels and are not coupled to each other. For example, the wheels connected to the motors can be the left 102' and right wheels 102", with reference to a baby carriage, or a cart. In this way, each motor drives a respective wheel and therefore it is possible, by suitably acting on the motors, to provide an assistance not only for advancing the device, but also for steering it, as it will be explained in the following. Alternatively, the motors can be coupled to the front wheels of the device (see the disabled person chair of FIG. 1d, for example). Preferably, the motors comprise brushless motors. Each motor is commanded by a command signal $I_{left}$, $I_{right}$, for example a current signal, to which respective driving/resistant torques exerted by the motors themselves correspond. The modes by which the command signals of the motors $I_{left}$, $I_{right}$ are determined will be specifically described in the following. To each wheels 102' and 102" can be associated corresponding suspensions 104', 104".

Advantageously, the movement device 1 further comprises one or more batteries (not shown in the figures) connected to the motors for exchanging power with them. Particularly, the batteries can supply the motors and can be further recharged, by receiving power from the motors when these act as generators. Further, the device 1 can comprise an outlet to be connected to an external power source for recharging the batteries.

According to a possible embodiment, the movement device 1 comprises a sensor adapted to detect the presence of the user and to supply a signal representative of such presence. For example, if the movement device 1 comprises a rod, grip, or handle 103, the presence detecting sensor can be associated to this latter, for detecting if the user is grasping the rod/grip/handle. As it will be apparent, enabling/disabling the motors can be correlated to the user presence signal. According to a possible embodiment, the user presence detecting sensor can comprise a capacitive sensor or fabric, or can be a photocell, or an infrared sensor. According to a further variant, the presence detecting sensor can comprise a RFID reader adapted to detect the proximity of a RFID tag, worn by the user for example. According to further possible variants, detecting the presence can be made by wireless systems, such as Bluetooth® or NFC (Near Field Communication).

According to a possible embodiment, in order to implement a user interface, the movement device further comprises a module communicating with an external device. For example, such communication module can be configured to communicate with a user cell phone or smartphone. The communication can be wireless, or wired by connecting the external device to a suitable outlet associated to the communication module which, in this case, can be also used for recharging the external device, by supplying it by the beforehand cited batteries. As it will be shown, the possibility of establishing a communication between the motorized movement device 1 and the external device enables the user to monitor and adjust the operative parameters of the movement device 1.

Moreover, the movement device 1 comprises an inertial measuring unit adapted to detect at least the longitudinal acceleration $a_x$, the pitch angular speed $\omega_y$ and the yaw angular speed $\omega_z$ of the movement device 1, and to provide signals indicative of the same.

In addition, the movement device 1 comprises sensors for detecting the speeds $v_{left}$, $v_{right}$ of the wheels 102', 102", to which the first and second motors are associated, configured to supply signals indicative of the same. Such speeds $v_{left}$, $v_{right}$ can be obtained, for example, from detections of the angular speeds of the two wheels 102', 102", from which it is possible to obtain the linear speeds $v_{left}$, $v_{right}$ by knowing the wheels radiuses.

If the movement device 1 is provided with suspensions 104, the device 1 can comprise sensors for detecting the elongations $\theta_{left}$, $\theta_{right}$ of the two suspensions 104' and 104" connected to the wheels 102', 102", to which the motors, configured to supply signals indicative of the same, are associated. Such sensors can comprise rotating potentiometers, linear potentiometers, encoders, strain gauges, or similar, for example.

Moreover, the movement device 1 comprises a control unit 2 receiving, at the input, signals from the above described sensors, and which commands the motors based on these, according to hereinbelow described modes. Further, the control unit 2 can command the power exchanges between the batteries and motors and can be connected to the communication module in order to interact with the user external device.

Figure 2:
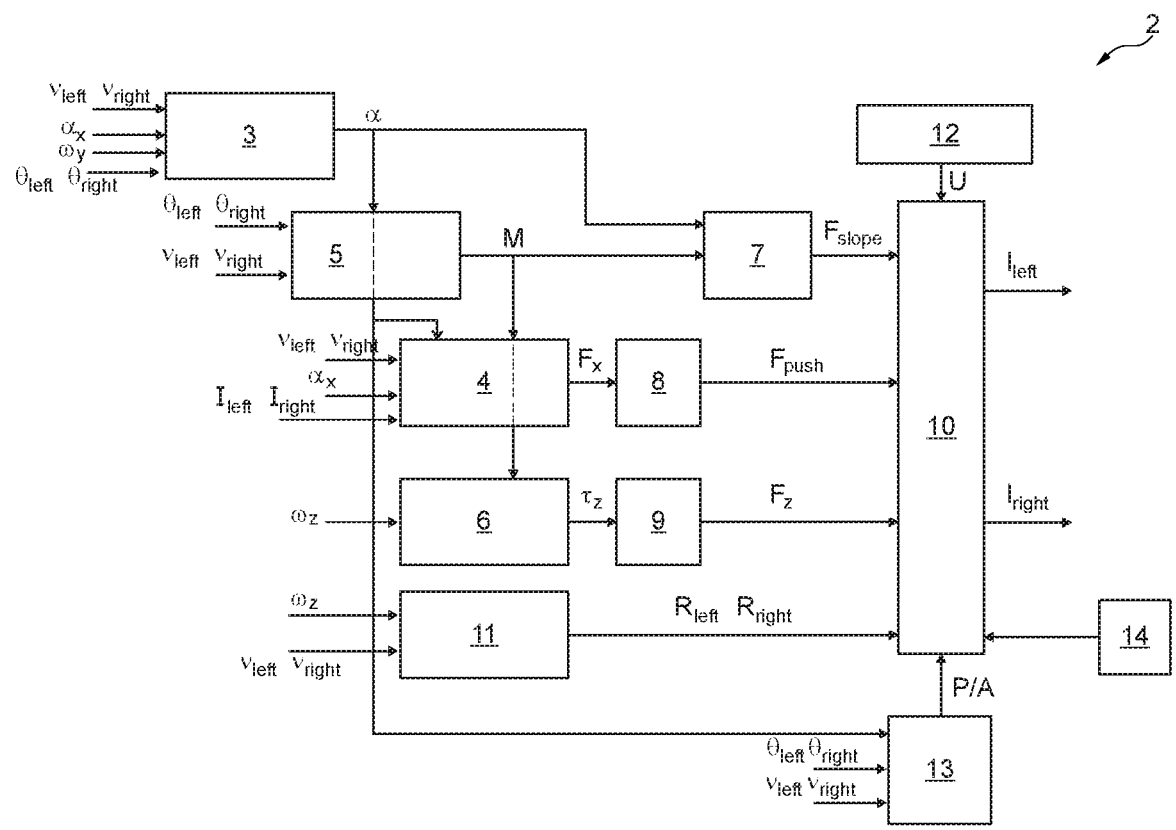
FIG. 2 is a block diagram of a control unit of a motorized movement device according to a possible embodiment of the invention.

With reference to FIG. 2, it shows a block diagram of the control unit 2 of the motorized movement device 1 according to a possible embodiment of the invention.

The control unit 2 comprises a module 3 for estimating the slope α, in other words the inclination of the path followed by the movement device 1. The slope α is estimated based on signals representative of the longitudinal acceleration ax, pitch angular speed $\omega_y$, and speeds $v_{left}$, $v_{right}$ of wheels 102' and 102". Estimating the slope α can be made by algorithms known in the field. With reference to this matter, see, for example: Matteo Corno, Pierfrancesco Spagnol, Sergio M. Savaresi: "Road slope estimation in bicycles without torque measurements." IFAC Proceedings Volumes 47.3 (2014): 6295-6300.

If the motorized movement device 1 is provided with suspensions 104', 104" and the elongations $\theta_{left}$, $\theta_{right}$ thereof are measured by the beforehand cited sensors, the slope α estimated by said modes is corrected for taking into account the additional inclination with respect to the ground which is taken by the ascending or descending movement device 1 due to the suspensions deformation. Specifically, once measured the deformation of the suspensions 104', 104" and known the geometrical characteristics of the movement device 1, it is possible to determine the additional inclination (positive or negative) to be subtracted from the estimated slope α.

Further, the movement device 1 comprises a module 4 for estimating the longitudinal thrust $F_x$ exerted by the user. The thrust, which is estimated by the module 4, is such to cause an advancement of the device 1 but does not cause it to steer. The longitudinal thrust $F_x$ is determined based on signals representative of the longitudinal acceleration ax, wheel speeds $v_{left}$, $v_{right}$, motor command signals $I_{left}$, $I_{right}$ and the slope α estimated by the module 3.

For example, the longitudinal thrust $F_x$ can be calculated by the following dynamic relationship:

$$F_x = M \cdot a_x + \mu(v, M) + K(I_{left} + I_{right}) + M \cdot g \cdot \sin(\alpha) \quad (1)$$

wherein:

M is the mass of the movement device and of a possible load thereof;

μ is an experimentally obtained function expressing the resistance forces acting on the device, as a function of the longitudinal speed v thereof—obtainable from the measured speeds $v_{left}$, $v_{right}$ of the wheels—and the mass M thereof. Such resistant forces particularly include the friction forces, particularly the rolling friction caused by the wheels rolling on the ground, and the aerodynamic drag, which can be alternatively neglected since is small at low speeds;

K is a function combining the command signals $I_{left}$, $I_{right}$ of the motors with the forces exerted by them, which will depend on the characteristics of the motors themselves, and also of the wheels to which they transmit the torque;

g is the gravity acceleration.

It is observed that the thrust estimating module 4 enables the device to get rid of sensors directly measuring the thrust exerted by the user, e.g. torque or force sensors associated to the handle which, besides determining additional costs, require maintenance, are difficult to be calibrated and are further jeopardized by possible false readings, caused, for example, by objects such as jackets, bags, or similar placed on the handle by the user.

Moreover, it is observed that with reference to the mass M, this can be input as a constant value, or can be set from time to time based on commands provided by the user, particularly through his/her own smartphone (the user can input the weight of a kid transported by the carriage, for example). For example, the user can select a weight class among predefined weight classes (light, medium, heavy, . . . ).

According to a further possible variant of the invention, the motorized movement device 1 comprises a module 5 for estimating the mass M. Such estimate is possible in the presence of the suspensions 104', 104" and sensors for measuring the elongations thereof. Indeed, the module 5 estimates the mass M based on signals indicative of the elongations $\theta_{left}$, $\theta_{right}$ of the suspensions, and of the speeds $v_{left}$, $v_{right}$ of the wheels, in addition to the slope α estimated by the module 3. Indeed, in static conditions, it is possible to simply determine the additional load with respect to the mass of the empty device from the static characteristic of the suspensions, which enables to correlate the measured deformations with the additional weight. Obviously, under dynamic conditions, particularly in the presence of accelerations and decelerations, or also in the presence of ascents and descents along the path, the suspensions inflect more than they do in the static case. Therefore, the mass M estimating module 5 must estimate the mass M only in the presence of static conditions or semi-static conditions, consequently, the module 5 can be configured so that, if the speeds $v_{left}$, $v_{right}$ of the wheels, and the accelerations obtainable by deriving these latter are less than predetermined threshold values, the mass M is determined based on a predetermined static map associating the elongations $\theta_{left}$, $\theta_{right}$ left, right of the suspensions and the estimated slope α with the mass M. Preferably, the mass M estimating module 5 comprises a low-pass filter configured to filter the signals indicative of the elongations $\theta_{left}$, $\theta_{right}$ of the suspensions in order to filter out the measuring noises.

Moreover, the movement device 1 comprises a module 6 for estimate the yaw torque τZ applied by the user to the device 1 itself. The yaw torque τZ represents a steering maneuver exerted by the user on the device 1. The yaw torque estimating module 6 receives, at the input, the signal representing the yaw angular speed ωz and the mass M estimated by the module 5, if is present. The yaw torque τZ can be estimated from the above cited inputs, for example, by the following relationship:

$$\tau_z = \frac{1}{j(M)} \dot{\omega}_z \qquad (2)$$

wherein:

$\dot{\omega}_z$ is the yaw angular acceleration obtainable by deriving the yaw angular speed $\omega_z$;

J(M) is the moment of inertia along the yaw axis of the device 1, varying as a function of the mass M. If this is considered constant, then the moment of inertia J will be constant. If the mass M is estimated with the above given modules by the module 5, it is on the contrary possible to update the estimate of the moment of inertia J based on a predefined relationship between the moment of inertia J itself and the estimated mass M. Generally, the moment of inertia J monotonically increases as the mass M increases.

According to the above modes, said control unit 2 estimates the slope α, the longitudinal thrust $F_x$, and the yaw torque τz. Each of these magnitudes represents an effort element exerted by the user of the device 1, which must be decreased by suitably slaving the motors 102', 102".

For this purpose, the control unit 2 comprises a slope compensating module 7 configured to determine a slope compensating force $F_{slope}$ based on the estimated slope α and possibly based on the estimated mass M, if the mass estimating module 5 is absent. If the module 5 is absent, the mass is considered fixed, according to what was previously described. For example, the slope compensating force $F_{slope}$ can be determined for compensating the gravitational force acting on the device 1 due to the slope α. Specifically, the compensating force $F_{slope}$ can be calculated by the following relationships:

$$F_{slope} = M \cdot g \cdot \sin(\alpha) \qquad (3)$$

wherein:

M is the mass, assumed fixed, or estimated by the module 5;

g is the gravity acceleration.

It is observed that, if the estimated slope α represents an ascent, the slope compensating force $F_{slope}$ is a driving force, while, if the estimated slope α represents a descent, the slope compensating force $F_{slope}$ is a braking force. If the slope compensating force $F_{slope}$ is calculated according to the formula (3), the result consists of holding the device in a static equilibrium also in the presence of ascents or descents.

Moreover, the control unit 2 comprises a module 8 for amplifying the thrust, con-figured to determine a thrust aiding force $F_{push}$ based on the longitudinal thrust $F_x$ exerted by the user, estimated by the module 4. For example, the thrust aiding force $F_{push}$ can be simply determined by multiplying the longitudinal thrust $F_x$ exerted by the user by a proportional factor. Such proportional factor can be fixed or can be set by the user through his/her own portable device.

Moreover, the control unit 2 comprises a module 9 for amplifying the yaw torque, configured to determine a steering aiding force $F_z$, based on the yaw torque τz estimated by the module 6. For example, the steering aiding force $F_z$ can be simply determined so that it can generate a torque obtained by multiplying the yaw torque τz by a proportional factor. Also, such proportional factor can be fixed, or can be set by the user through his/her own portable device. Obviously, the steering aiding force $F_z$ is not applied in the same way to the two motors since it must generate a steering torque of the device 1.

The control unit 2 comprises a torque allocating module 10, configured to deter-mine the command signals $I_{left}$, $I_{right}$ of the motors and consequently the torques supplied by each of them, based on the slope compensating force $F_{push}$, thrust aiding force $F_{push}$, and steering aiding force $F_z$. Consequently, the motors supply torques such as to exert determined aiding forces.

For example, the motor commanding signals can be determined by the following relationships:

$$I_{left} = \frac{(F_{slope} + F_{push})}{2K} + \frac{F_z}{2K} \qquad (4)$$
$$I_{right} = \frac{(F_{slope} + F_{push})}{2K} - \frac{F_z}{2K}$$

wherein K is a dimensional constant. It is observed that, based on the formula (4), the slope compensating force $F_{slope}$ and the thrust aiding force $F_{push}$ are equally shared by the two motors, while the steering aiding force $F_z$ is applied to the two motors with opposite signs, so that the motor generates a steering torque about the yaw axis.

It is observed that the user can act on how much the motors are enslaved by means of the external device, and consequently on the torque generated by them, for taking into account the type of the roadway. For example, the user can select among several predefined types of the roadway (for example: smooth, normal, rough).

According to a possible embodiment, the control unit 2 is configured so that the torque allocating module 10 compensates possible differences between the radiuses of the two wheels ascribed to manufacturing mistakes or to an asymmetric wear of the same. Indeed, the differences between the radiuses of the two wheels can determine an asymmetric slavery of the motors. Therefore, it can occur the following condition:

$$R_{left} = R_{nom} + \delta_{left}$$

$$R_{right} = R_{nom} + \delta_{right} \qquad (6)$$

wherein $\delta_{left}$ and $\delta_{right}$ are the effective offsets of the effective radiuses $R_{left}$ and $R_{right}$ of the two wheels from the nominal radius $R_{nom}$.

In order to avoid this possible inconvenience, the control unit 2 can comprise a module 11 for estimating the effective radiuses $R_{left}$ and $R_{right}$ based on the signals representing the speeds $v_{left}$, $v_{right}$ of the wheels and the yaw speed ωz. The estimate can be obtained when the device moves straight or almost straight and therefore the yaw angular speed $\omega_z$ is zero or less than a threshold value. Under such condition, it is for example possible to determine the least offsets $\delta_{left}$ and $\delta_{right}$ in order to verify the following condition:

$$v_{left} R_{left} = v_{right} R_{right} \qquad (6)$$

Based on the effective values of the radiuses $R_{left}$ and $R_{right}$ of the two wheels, the torque allocating module 10 can correct the command signals $I_{left}$, $I_{right}$, calculated by assuming the radiuses of the two wheels are equal, so that the torques generated by the motors offset the asymmetry caused by different radiuses of the wheels.

It is observed that the module 11 for estimating the effective radiuses $R_{left}$ and $R_{right}$ is, more generally, capable of compensating conditions causing a drift. Apart from the differences between the radiuses of the wheels caused by wear or manufacturing errors, such condition can be verified for example in the following cases: friction differences between the wheels on the two sides of the vehicle (for example if one of the two wheels is partially deflated), differences in the roadway between one side and the other of the device, asymmetric thrust exerted by the user.

A further asymmetry, which can be found, can be determined by the positions of the transported loads. This aspect can be monitored by the suspension elongation sensors, if present, and can be consequently compensated by the torque allocating module.

According to a possible embodiment, the torque allocating module 10 further receives, at the input, the signal representing the presence of the user (U), from the associated presence sensor indicated by 12 in FIG. 2. Specifically, the torque allocating module 10 is configured to generate the motor commanding signals $I_{left}$, $I_{right}$ only if the user presence sensor detects the presence thereof. In other words, if the presence of the user is not detected, the motors are deactivated, and the device becomes a completely passive system. Consequently, the device is prevented from being inadvertently actuated even though the user is present.

According to an embodiment, the control unit 2 comprises a module 13 for identifying a maneuver for getting past an obstacle. In this regard, it is considered a case shown in FIG. 3, wherein the user moving the baby carriage comes across a step. Under such condition, the typical maneuver performed by user is to raise the front wheels by applying a downwardly directed force $F_{user}$, then, with the front wheels still raised, he/she longitudinally pushes the carriage for getting past the step. Under such condition, the carriage is tilted and consequently the slope estimating module 3 estimates an erroneous slope α, because is not determined by the slope of the path, but by a maneuver performed by the user. Under such condition, the torque allocating module 10 is required to neglect the slope compensating force $F_{slope}$, in order to prevent the motors from generating a torque not according to the real condition under which the device is subjected, in other words not a sloping road but an obstacle present along the path.

Advantageously, the module 13 identifying a maneuver for getting past an obstacle, is configured to identify the presence of an obstacle based on the slope α estimated by the module 3, on signals representing the suspensions elongations $\theta_{left}$, $\theta_{right}$, and based on the speeds $v_{left}$, $v_{right}$ of the wheels, and to provide, at the output, a signal indicating the presence/absence (P/A) of the obstacle, which is supplied to the torque allocating module 10. This latter, in turn, is configured to neglect the slope compensating force $F_{slope}$ if the obstacle identifying module 13 supplies an obstacle presence signal.

The several possible obstacles which can be found by the device 1, can be got past by standard maneuvers which determine specific trends of the signals entering the module 13 identifying a maneuver for getting past an obstacle. For example, still referring to the condition of FIG. 3, upon bringing the speed to zero, it is detected a compression of the suspensions caused by the raising front wheels and simultaneously an abrupt increase of the estimated slope α. Then, it is detected a speed of the wheels when the baby carriage is raised on the step, followed by an abrupt drop of the estimated slope and also by a compression decrease of the suspensions. Therefore, the maneuver for getting past the obstacle can be codified and identified by the module 13.

According to an embodiment, the movement device 1 comprises an assistance command 14 commandable by the user for increasing the power of the motors. The assistance command 14 is connected to the torque allocating module 10 so that, upon requiring a power increase by the user, this generates command signals $I_{left}$, $I_{right}$ so that the motors generate an additional torque, which can be used, for example, for more easily getting past an obstacle, e.g. a step. According to a further possible variant, further assistance commands are provided, for example for enabling a user to select a different direction of the additional torque that must be supplied by the motor. For example, if the baby carriage 1 is pulled instead of being pushed, as shown in FIG. 3, the additional torque supplied by the motors must have a direction opposite to the one of a pushed carriage 1.

According to a possible further embodiment, the torque allocating module 10 can be commandable, for example, by the external device, so that the motors obey to predefined torque laws. For example, in case of a baby carriage, the motors can be commanded for imparting to the carriage movements for rocking the baby without requiring a manual action by the user (oscillating movements as: back-and-forth, right-and-left).

The movement device, according to the invention, can be further set for performing additional functions apart the above described ones. For example, the motors can be set so that they exert a resistance to the advancement (settable by the user, for example through his/her own smartphone) for generating an additional effort perceived by the user. Such setting has the result of physically exercising the user and recharging the batteries.

According to a possible embodiment, the user presence detecting sensor, hereinbefore described, can further have an anti-theft function.

It is observed that in present description and in the attached claims, the elements called "module", can be implemented by hardware devices (for example central processing units), by software or by a combination of hardware and software.

To the described embodiments of the motorized movement device according to the invention, a person skilled in the art in order to satisfy specific contingent needs, could introduce many additions, modifications, or substitutions of elements with other operatively equivalent, without falling out of the scope of the attached claims.

The invention claimed is:

1. A motorized movement device (1) comprising:
    a frame (101);
    a first (102') and second (102") wheels connected to the frame (101), and a first and second motors connected respectively to the first (102') and second (102") wheels and commandable by respective command signals ($I_{left}$, $I_{right}$);
    an inertial measuring unit configured to detect longitudinal acceleration ($a_x$), pitch angular speed ($\omega y$), and yaw angular speed ($\omega z$) of the movement device and for providing signals representative of the same;
    sensors for detecting speeds ($v_{left}$, $v_{right}$) of said first (102') and second (102") wheels and configured to provide signals representative of the same;
    a control unit (2) comprising:
        a module (3) for estimating slope ($\alpha$) based on the signals representative of the longitudinal acceleration ($a_x$), of the pitch angular speed ($\omega y$), and of the speeds ($v_{left}$, $v_{right}$) of said first (102') and second (102") wheels;
        a module (4) for estimating the longitudinal thrust ($F_x$) exerted by a user to the device (1) based on the signals representative of the longitudinal acceleration ($a_x$), of the speeds ($v_{left}$, $v_{right}$) of said first (102') and second (102") wheels, of the command signals of the motors ($I_{left}$, $I_{right}$) and of the estimated slope ($\alpha$);
        a module (6) for estimating the yaw torque ($\tau z$) applied by the user on the movement device (1) based on the signal representative of the yaw angular speed ($\omega z$);
        a module (7) for compensating the slope, configured to determine a slope compensating force ($F_{slope}$) based on the estimated slope ($\alpha$);
        a thrust amplifying module (8), configured to determine a thrust aiding force ($F_{push}$) based on the estimated longitudinal thrust ($F_x$);
        a yaw torque amplifying module (9), configured to determine a steering aiding force ($F_z$) based on the estimated yaw torque ($\tau z$);
        a torque allocating module (10), configured to determine said command signals ($I_{left}$, $I_{right}$) of the first and second motors based on the slope compensating force ($F_{slope}$), on the thrust aiding force ($F_{push}$) and on the steering aiding force ($F_z$).

2. A motorized movement device (1) according to claim 1, further comprising a first (104') and a second (104") suspensions operatively interposed between the frame (101) and said first (102') and second (102") wheels, and sensors for detecting the elongations ($\theta_{left}$, $\theta_{right}$) of said first (104') and second (104") suspensions, configured to provide signals representative of the same.

3. A motorized movement device (1) according to claim 2, wherein said slope ($\alpha$) estimating module (3) is configured to estimate said slope ($\alpha$) further based on said signals representative of the elongations ($\theta_{left}$, $\theta_{right}$) of said first (104') and second (104") suspensions.

4. A motorized movement device (1) according to claim 2, comprising a module (5) for estimating the mass (M) of the movement device (1) and of the load transported by it based on signals representative of the elongations ($\theta_{left}$, $\theta_{right}$) of the suspensions (104', 104"), of the speeds ($v_{left}$, $v_{right}$) of the wheels (102', 102") and of the estimated slope ($\alpha$).

5. A motorized movement device (1) according to claim 4, wherein said module (4) for estimating the longitudinal thrust ($F_x$) exerted by the user on the device (1) is configured to estimate said longitudinal thrust ($F_x$) further based on said estimated mass (M).

6. A motorized movement device (1) according to claim 4, wherein said module (6) for estimating the yaw torque ($\tau z$) applied by the user on the movement device (1) is configured to estimate the yaw torque ($\tau z$) further based on said estimated mass (M).

7. A motorized movement device (1) according to claim 4, wherein said slope compensating module (7) is configured to determine the slope compensating force ($F_{slope}$) further based on said estimated mass (M).

8. A motorized movement device (1) according to claim 2, wherein the control unit (2) comprises a module (13) for identifying a maneuver for getting past an obstacle, configured to identify the presence of an obstacle (P/A) based on the trend of the estimated slope ($\alpha$), of the signals representative of the elongations of the suspensions ($\theta_{left}$, $\theta_{right}$) and of the wheels speeds ($v_{left}$, $v_{right}$), and to provide, at the output, a signal indicating the presence or absence of said obstacle, wherein the torque allocating module (10) is connected to the module (13) identifying a maneuver for getting past an obstacle, and is configured to disregard the slope compensating force ($F_{slope}$) in case the module for acknowledging the maneuver for getting past an obstacle (13), supplies an obstacle presence signal.

9. A motorized movement device (1) according to claim 1, wherein the control unit (2) further comprises a module (11) for estimating the effective radiuses ($R_{left}$, $R_{right}$) of said first (102') and second wheels (102") based on signals representative of the speeds ($v_{left}$, $v_{right}$) of the wheels (102', 102") and of the yaw angular speed ($\omega z$), said torque allocating module (10) being connected to the module (11) for estimating the effective radiuses and being configured to correct the motors command signals ($I_{left}$, $I_{right}$), based on said estimated effective radiuses ($R_{left}$, $R_{right}$).

10. A motorized movement device (1) according to claim 1, further comprising one or more handles (103) and one or more sensors (12) associated to said one or more handles and configured to detect the presence of the user (U) and to provide a signal representative of such presence, wherein the torque allocating module (10) is connected to said sensors detecting the presence of the user and is configured to generate said motors commanding signals ($I_{left}$, $I_{right}$) only if the one or more sensors detecting the presence of the user supply an user presence signal.

11. A motorized movement device (1) according to claim 1, further comprising at least one assistance command (14), commandable by the user and connected to the torque allocating module (10) so that, upon activating the assistance command (14) by the user, the torque allocating module (10) outputs command signals ($I_{left}$, $I_{right}$) so that the motors supply an additional driving torque.

12. A motorized movement device (1) according to claim 1, further comprising a module communicating with an external device, such as mobile phone, or a smartphone, connected to the control unit (2), so that operative parameters of the control unit (2) are monitorable and/or settable by said external device.

13. A motorized movement device (1) according to claim 1, selected in the group consisting of: baby carriages, trolleys, carts for transporting goods, shopping carts, golf club trolleys, airport trolleys, suitcases, disabled chairs, wheelchairs, stretchers, walkers, hospital beds.

* * * * *